United States Patent
Nakamoto et al.

(10) Patent No.: US 9,755,276 B2
(45) Date of Patent: Sep. 5, 2017

(54) LIQUID ELECTROLYTE FOR FLUORIDE ION BATTERY AND FLUORIDE ION BATTERY

(71) Applicants: Toyota Jidosha Kabushiki Kaisha, Toyota-shi, Aichi-ken (JP); Kyoto University, Kyoto-shi, Kyoto-fu (JP)

(72) Inventors: Hirofumi Nakamoto, Kyoto (JP); Zempachi Ogumi, Kyoto (JP); Takeshi Abe, Takatsuki (JP)

(73) Assignees: Toyota Jidosha Kabushiki Kaisha, Toyota-shi (JP); Kyoto University, Kyoto-shi (JP)

(*) Notice: Subject to any disclaimer, the term of this patent is extended or adjusted under 35 U.S.C. 154(b) by 48 days.

(21) Appl. No.: 14/815,129

(22) Filed: Jul. 31, 2015

(65) Prior Publication Data

US 2016/0043440 A1    Feb. 11, 2016

(30) Foreign Application Priority Data

Aug. 6, 2014   (JP) ................. 2014-160031

(51) Int. Cl.
*H01M 10/0569* (2010.01)
*H01M 10/054* (2010.01)
*H01M 10/0568* (2010.01)

(52) U.S. Cl.
CPC ..... *H01M 10/0569* (2013.01); *H01M 10/054* (2013.01); *H01M 10/0568* (2013.01); *H01M 2300/0028* (2013.01)

(58) Field of Classification Search
CPC ......... H01M 10/0569; H01M 10/0568; H01M 10/054; H01M 2300/0028
See application file for complete search history.

(56) References Cited

U.S. PATENT DOCUMENTS

| | | | |
|---|---|---|---|
| 5,538,811 A * | 7/1996 | Kanbara | H01M 10/0565 252/62.2 |
| 2012/0164541 A1 | 6/2012 | Darolles et al. | |
| 2013/0026978 A1* | 1/2013 | Cooley | H01M 10/0568 29/623.1 |

* cited by examiner

*Primary Examiner* — Laura Weiner
(74) *Attorney, Agent, or Firm* — Dinsmore & Shohl LLP

(57) ABSTRACT

An object of the present invention is to provide a liquid electrolyte for a fluoride ion battery with improved fluoride ion stability. By providing a liquid electrolyte for a fluoride ion battery comprising a fluoride salt and a diol compound in which one or two ether bonds are disposed between two OH groups, the present invention achieves the aforementioned object.

4 Claims, 3 Drawing Sheets

EXAMPLE 1 (TRIETHYLENE GLYCOL)

EXAMPLE 2 (DIETHYLENE GLYCOL)

COMPARATIVE EXAMPLE 1 (ETHYLENE GLYCOL)

COMPARATIVE EXAMPLE 2 (1,3-PROPANE DIOL)

COMPARATIVE EXAMPLE 3 (DIETHYLENE GLYCOL DIMETHYL ETHER)

COMPARATIVE EXAMPLE 4 (TRIETHYLENE GLYCOL DIMETHYL ETHER)

LIQUID ELECTROLYTE FOR FLUORIDE ION BATTERY AND FLUORIDE ION BATTERY

TECHNICAL FIELD

The present invention relates to a liquid electrolyte for a fluoride ion battery with improved fluoride ion stability.

BACKGROUND ART

As a battery with high voltage and high energy density, a Li ion battery is known, for example. The Li ion battery is a cation-based battery utilizing the reaction between a Li ion and a cathode active material and also the reaction between a Li ion and an anode active material. Meanwhile, as an anion-based battery, a fluoride ion battery utilizing a fluoride ion reaction is known. In Patent Literature 1, for example, a fluoride ion battery having an anode, a cathode, an electrolyte containing a fluoride salt, and a predetermined additive is disclosed.

In claim 13 of Patent Literature 1, alcohol is exemplified as one solvent which can be selected. However, in other parts of Patent Literature 1, use of alcohol is not described at all.

CITATION LIST

Patent Literature

Patent Literature 1: US 2012/0164541 A

SUMMARY OF INVENTION

Technical Problem

The fluoride ion has a problem of low activity for fluorinating an active material due to low stability of the fluoride ion. In other words, due to high reactivity of the fluoride ion, the fluoride ion reacts with other materials (liquid electrolyte, in particular) before reaction with an active material, and thus there is a problem in that the fluoride ion cannot have a sufficient reaction with an active material.

The present invention is achieved under the aforementioned circumstances, and a main object of the present invention is to provide a liquid electrolyte for a fluoride ion battery with improved fluoride ion stability.

Solution to Problem

In order to solve the above problem, the present invention provides a liquid electrolyte for a fluoride ion battery comprising a fluoride salt and a diol compound in which one or two ether bonds are disposed between two OH groups.

According to the present invention, when the diol compound in which one or two ether bonds are disposed between two OH groups is used, a liquid electrolyte for a fluoride ion battery with improved fluoride ion stability can be provided.

According to the aforementioned invention, a molar ratio of the diol compound relative to a fluoride ion is preferably more than 0.5.

Further, the present invention provides a fluoride ion battery comprising a cathode active material layer, an anode active material layer, and an electrolyte layer formed between the cathode active material layer and the anode active material layer, wherein the electrolyte layer contains the above-described liquid electrolyte for a fluoride ion battery.

According to the present invention, when the above-described liquid electrolyte for a fluoride ion battery is used, a fluoride ion battery with high capacity can be provided.

Advantageous Effects of Invention

The liquid electrolyte for a fluoride ion battery of the present invention exhibits an effect of improving the stability of a fluoride ion.

DESCRIPTION OF EMBODIMENTS

Hereinafter, a liquid electrolyte for a fluoride ion battery and a fluoride ion battery of the present invention will be described in detail.

A. Liquid Electrolyte for Fluoride Ion Battery

The liquid electrolyte for a fluoride ion battery of the present invention comprises a fluoride salt and a dial compound in which one or two ether bonds are disposed between two OH groups.

According to the present invention, when the diol compound in which one or two ether bonds are disposed between two OH groups is used, a liquid electrolyte for a fluoride ion battery with improved stability of a fluoride ion can be provided. As a result, the activity of a fluoride ion for fluorinating an active material is increased and the battery reaction occurs stably at an electrode, and thus the battery with large capacity can be provided. It is believed that the reason for improving stability of a fluoride ion is as described below.

Figure 1:
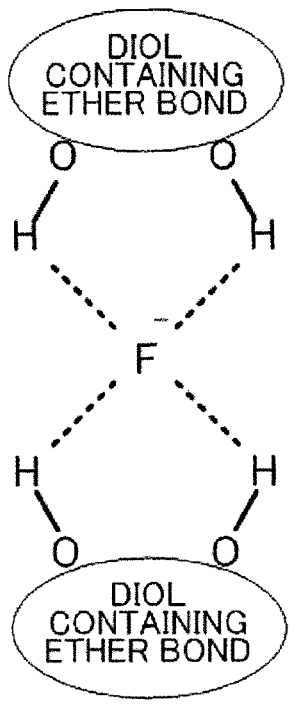
FIG. 1 is a schematic diagram for describing the presumed mechanism of the present invention.

That is, as illustrated in FIG. 1, when the diol compound of the present invention (diol containing an ether bond) is used, the diol compound can be disposed such that the diol compound can surround one fluoride ion ($F^-$). The H element of OH group of the diol compound can easily and selectively interact with $F^-$. Meanwhile, the O element of OH group has high electronegativity so that it does not easily release $H^+$. Accordingly, the O element does not have excess binding with a fluoride ion (does not react with a fluoride ion). It is thus believed that the stability of a fluoride ion is improved.

Furthermore, when a compound having a proton-donating property reacts with $F^-$, there is a possibility of generating HF. Since HF has toxicity, a compound having a proton-donating property is generally not used for a liquid electrolyte for a fluoride ion battery. In the present invention, the OH group has a proton-donating property but the proton-donating property thereof is lower than that of a common acid or the like. By taking advantage of such characteristics of OH group, the stability of a fluoride ion can be eventually improved.

Figure 2A:
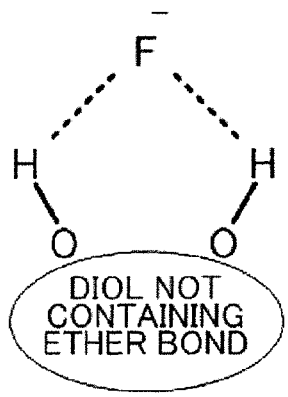
FIGS. 2A and 2B are schematic diagrams for describing the presumed mechanism of the present invention.
Figure 2B:
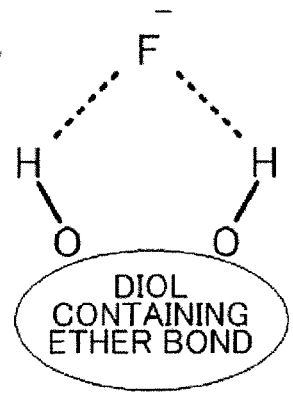

Furthermore, as described in Comparative Examples shown below, with a diol compound which has two OH groups but no ether bond (diol not containing an ether bond), the effect of the present invention is not obtained. It is believed that the reason is as described below. That is, as shown in FIG. 2A, in diol not containing an ether bond, the OH group strongly binds to F$^-$ due to a chelating effect, and thus it is believed that F$^-$ is overly stabilized (complex is formed). Meanwhile, as shown in FIG. 2B, since stabilization of a molecular structure is prevented by an ether bond in diol containing an ether bond, forming a stable complex is relatively difficult (the chelating effect is alleviated). It is thus believed that, as a complex having suitable interaction with a fluoride ion can be formed, the stability of a fluoride is consequently improved. In addition, since the stability of a fluoride ion is improved in the present invention, it is also expected to have an effect of improving the Coulomb efficiency or an effect of inhibiting the generation of hydrofluoric acid (HF).

Hereinafter, each constitution of the liquid electrolyte for a fluoride ion battery of the present invention will be described.

1. Diol Compound

The dial compound of the present invention is a compound in which one or two ether bonds are disposed between two OH groups. The diol compound is preferably used as a solvent for dissolving a fluoride salt.

The diol compound of the present invention has two OH groups. The OH group may be present at an end of the chemical structure of a diol compound, or within the chemical structure of a diol compound. Furthermore, the ether bond of a diol compound is disposed between two OH groups. Specifically, within a chemical structure in which the carbon bonded with one OH group is a start point and the carbon bonded with the other OH group is an end point, the ether bond is formed. By forming an ether bond at such position, flexibility of the two OH groups that are disposed to have the ether bond between them can be improved. Incidentally, the diol compound in the present invention may or may not have an ether bond other than the chemical structure in which the carbon bonded with one OH group is a start point and the carbon bonded with the other OH group is an end point. If it has an ether bond, the number of ether bond is not particularly limited.

The number of carbon atoms of the diol compound is, for example, 3 or more, and preferably 4 or more. Meanwhile, the number of carbon atoms of the diol compound is, for example, 20 or less, and preferably 16 or less. Furthermore, the molecular chain of the diol compound may be either linear or branched. The hydrogen bonded to the carbon of the molecular chain may be substituted with other element. Examples of other element include halogen such as fluorine. Furthermore, the diol compound may be either a saturated compound or an unsaturated compound, but the former is preferable due to high chemical stability.

The diol compound generally has a hydrocarbon skeleton, an ether bond, and an OH group. The diol compound may be composed only of a hydrocarbon skeleton, an ether bond, and an OH group. Alternatively, it may have other functional group. Other functional group indicates a functional group which allows obtainment of the effect of the present application. Meanwhile, the dial compound preferably contains no functional group which has a higher proton-donating property than that of OH group, since there is a possibility of generating HF. Examples of the functional group which has a higher proton-donating property than that of OH group include a carboxylic acid group.

In the present invention, examples of the diol compound include diethylene glycol, triethylene glycol, and a derivative thereof.

Furthermore, the solvent for the liquid electrolyte for a fluoride ion battery may be composed of the diol compound only, or may be a mixture of a diol compound and other solvent. The ratio of the diol compound relative to whole solvent is, for example, 10 mol % or more, preferably 30 mol % or more, more preferably 50 mol % or more, even more preferably 70 mol % or more, and particularly preferably 90 mol % or more.

Examples of other solvent include an ionic liquid and a non-aqueous solvent. Since the ionic liquid generally has high viscosity, it can be provided as a liquid electrolyte with low viscosity by combining it with an alcohol material. The ionic liquid indicates a material which has a melting point of 100° C. or lower. In particular, the melting point of an ionic liquid is preferably 50° C. or lower, and more preferably, 25° C. or lower.

Examples of the cation of an ionic liquid include a piperidinium skeleton cation, a pyrrolidinium skeleton cation, an imidazolium skeleton cation, an ammonium cation, and a phosphonium cation.

Examples of the anion of an ionic liquid include an amide anion represented by bisfluorosulfonylamide (FSA) anion and bistrifluoromethane sulfonylamide (TFSA) anion, a phosphate anion represented by hexafluorophosphate anion and tris(pentafluoroethyl)trifluorophosphate anion, a tetrafluoroborate (TFB) anion, and a triflate anion.

The type of the non-aqueous solvent is not particularly limited, and examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and a mixture of any of them.

2. Fluoride Salt

In the present invention, the fluoride salt is not particularly limited as long as it generates a fluoride ion which reacts with an active material. The fluoride salt may be an organic fluoride salt or an inorganic fluoride salt. Furthermore, the fluoride salt may be an ionic liquid.

The cation of the fluoride salt is not particularly limited, and examples thereof include a complex cation. Examples of the complex cation include an alkylammonium cation, an alkylphosphonium cation, and an alkylsulfonium cation. Examples of the alkylammonium cation include a cation represented by the following general formula.

[Chemical Formula 1]

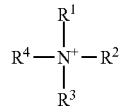

In the above general formula, R$^1$ to R$^4$ each independently represent an alkyl group or a fluoroalkyl group. The number of carbon atoms of R$^1$ to R$^4$ is, for example, 10 or less, and may be 5 or less, or 3 or less.

The anion of the fluoride salt is not particularly limited as long as it generates a fluoride ion which reacts with an active material. In particular, F⁻ is preferred.

3. Liquid Electrolyte for Fluoride Ion Battery

In the present invention, as shown in FIG. 1, the diol containing an ether bond is preferably disposed so as to surround one fluoride ion (F⁻). The molar ratio of the diol compound relative to the fluoride ion contained in a liquid electrolyte is, for example, preferably more than 0.5, more preferably 1 or more, even more preferably 1.5 or more, and particularly preferably 2 or more. Meanwhile, the molar ratio is preferably 5000 or less, for example. Furthermore, the molar ratio can be calculated based on the concentration of the fluoride ion and the diol compound that are included in a liquid electrolyte. Those concentrations can be obtained from $^{19}$F-NMR or $^1$H-NMR, for example.

The fluoride salt concentration in the liquid electrolyte for a fluoride ion battery is in a range of 0.4 mol % to 45 mol %, for example. It is preferably in a range of 0.7 mol % to 10 mol %.

Incidentally, it is difficult for F⁻ to dissociate from HF in $F(HF)_x^-$ anion. For this reason, sufficient fluorination of an active material is not easily obtained in some cases. Incidentally, "x" is a real number larger than 0, and satisfies the relationship of 0<x≤5, for example. For this reason, it is preferable that the liquid electrolyte for a fluoride ion battery contain substantially no $F(HF)_x^-$ anion. The expression "contain substantially no $F(HF)_x^-$ anion" means that the ratio of $F(HF)_x^-$ anion relative to the whole anions present in the liquid electrolyte is 0.5 mol % or less. The ratio of $F(HF)_x^-$ anion is preferably 0.3 mol % or less.

B. Fluoride Ion Battery

Figure 3:
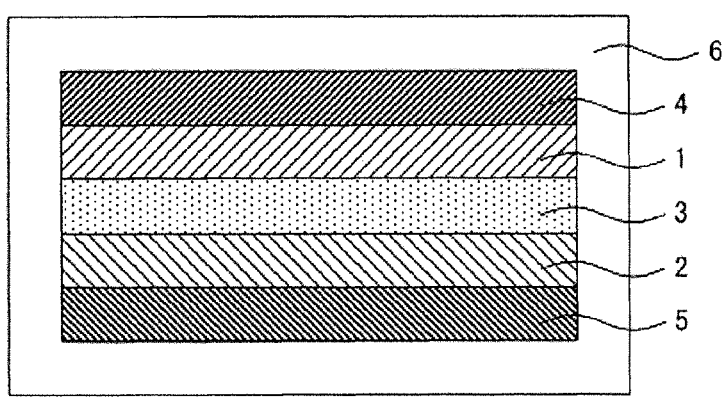
FIG. 3 is a schematic cross-sectional view illustrating an exemplary fluoride ion battery of the present invention.

FIG. 3 is a schematic cross-sectional view illustrating an exemplary fluoride ion battery of the present invention. A fluoride ion battery 10 illustrated in FIG. 3 comprises a cathode active material layer 1, an anode active material layer 2, an electrolyte layer 3 formed between the cathode active material layer 1 and the anode active material layer 2, a cathode current collector 4 for collecting current by the cathode active material layer 1, a anode current collector 5 for collecting current by the anode active material layer 2, and a battery case 6 for containing those members. Furthermore, the electrolyte layer 3 contains "A. Liquid Electrolyte for Fluoride Ion Battery" which is described above.

According to the present invention, when the aforementioned liquid electrolyte for a fluoride ion battery is used, a fluoride ion battery with large capacity can be provided.

Hereinafter, each constitution of the fluoride ion battery of the present invention will be described.

1. Electrolyte Layer

The electrolyte layer in the present invention is a layer which is formed between the cathode active material layer and the anode active material layer. In the present invention, the electrolyte layer contains the aforementioned liquid electrolyte for a fluoride ion battery. The thickness of the electrolyte layer varies greatly depending on the constitution of a battery, and is not particularly limited.

2. Cathode Active Material Layer

The cathode active material layer in the present invention is a layer which contains at least a cathode active material. Furthermore, the cathode active material layer may further contain at least one of a conductive material and a binder, in addition to a cathode active material.

The cathode active material in the present invention is an active material which generally de-fluorinates at discharge. Examples of the cathode active material include a metal element, an alloy, a metal oxide, and a fluoride thereof.

Examples of the metal element included in the cathode active material include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, $CuF_x$, Pb, PbFx, Bi, BiFx, Ag, or $AgF_x$. Incidentally, "x" is a real number larger than 0. Cu and $CuF_x$ are a material with high energy density, and they are preferable from such point of view. Other examples of the cathode active material include a carbon material and a fluoride thereof. Examples of the carbon material include graphites, cokes, and carbon nanotubes. Furthermore, other examples of the cathode active material include a polymer material. Examples of the polymer material include polyaniline, polypyrrole, polyacetylene, and polythiophene.

The conductive material is not particularly limited as long as it has desired electron conductivity. Examples thereof include a carbon material. Examples of the carbon material include carbon black such as acetylene black, ketjen black, furnace black, graphene, fullerene, carbon nano tube, or thermal black. Meanwhile, the binder is not particularly limited as long as it is chemically and electrically stable. Examples thereof include a fluorine-based binder such as polyvinylidene fluoride (PVDF) and polytetrafluoroethylene (PTFE). Furthermore, higher content of the cathode active material in the cathode active material layer is preferred from the viewpoint of capacity. Furthermore, the thickness of the cathode active material layer varies greatly depending on the constitution of a battery, and is not particularly limited.

3. Anode Active Material Layer

The anode active material layer in the present invention is a layer which contains at least an anode active material. Furthermore, the anode active material layer may further contain at least one of a conductive material and a binder, in addition to an anode active material.

The anode active material in the present invention is an active material which generally fluorinates at discharge. As for the anode active material, any active material having lower potential than that of the cathode active material can be selected. For these reasons, the aforementioned cathode active material may be also used as an anode active material. Examples of the anode active material include a metal element, an alloy, a metal oxide, and a fluoride thereof. Examples of the metal element included in the anode active material include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, La, LaFx, Pb, or $PbF_x$. Incidentally, "x" is a real number larger than 0. Furthermore, as the anode active material, the aforementioned carbon material and polymer material can be also used.

The same conductive material and binder as those described above for the cathode active material layer can be also used. Furthermore, higher content of the anode active material in the anode active material layer is preferred from the viewpoint of capacity. Furthermore, the thickness of the anode active material layer varies greatly depending on the constitution of a battery, and is not particularly limited.

4. Other Constitutions

The fluoride ion battery of the present invention comprises at least the anode active material layer, the cathode active material layer, and the electrolyte layer that are described above. Furthermore, the fluoride ion battery generally comprises a cathode current collector for collecting current by the cathode active material layer and an anode current collector for collecting current by the anode active material layer. Examples of the shape of the current collector include a thin film shape, a mesh shape, and a porous shape. Furthermore, the fluoride ion battery of the present invention may comprise a separator between the cathode active material layer and the anode active material layer, since a battery having even higher safety can be obtained.

5. Fluoride Ion Battery

The fluoride ion battery of the present invention is not particularly limited as long as it comprises the cathode active material layer, the anode active material layer, and the electrolyte layer that are described above. In addition, the fluoride ion battery of the present invention may be a primary battery or a secondary battery. In particular, a secondary battery is preferable, since the secondary battery can be repeatedly charged and discharged and is useful as, for example, a battery mounted on an automobile. Examples of the shape of the fluoride ion battery of the present invention include a coin shape, a laminate shape, a cylindrical shape, and a square shape.

Incidentally, the present invention is not limited to the embodiments described above. The above embodiments are merely an exemplification and any of those having substantially the same constitution as the technical idea described in Claims of the present invention and exhibiting the same working effects as those are included in the technical scope of the present invention.

EXAMPLES

Hereinafter, the present invention will be described in more detail by means of Examples.

Example 1

Tetramethylammonium fluoride (TMAF, fluoride salt, manufactured by Aldrich) and triethylene glycol (diol compound, manufactured by Aldrich) were weighed and mixed with each other at a molar ratio of fluoride salt:diol compound=1:100. After that, the resultant mixture was stirred under conditions of 30° C. for 48 hours within a sealed container made of a fluororesin, thereby obtaining a liquid electrolyte for evaluation.

Example 2

A liquid electrolyte for evaluation was obtained in the same manner as in Example 1, except that diethylene glycol (manufactured by Aldrich) was used as a diol compound.

Comparative Example 1

A liquid electrolyte for evaluation was obtained in the same manner as in Example 1, except that ethylene glycol (manufactured by Aldrich) was used as a diol compound and stirring conditions were changed to 25° C. for 72 hours.

Comparative Example 2

A liquid electrolyte for evaluation was obtained in the same manner as in Example 1, except that 1,3-propane diol (manufactured by Aldrich) was used as a diol compound and stirring conditions were changed to 25° C. for 72 hours.

Comparative Example 3

A liquid electrolyte for evaluation was obtained in the same manner as in Example 1, except that diethylene glycol dimethyl ether (manufactured by Kishida Chemical Co., Ltd.) was used instead of a diol compound and stirring conditions were changed to 30° C. for 72 hours. However, the TMAF was not dissolved.

Comparative Example 4

Figure 4:
FIG. 4 shows compounds used in Examples 1 and 2 and Comparative Examples 1 to 4.
Figure 4:
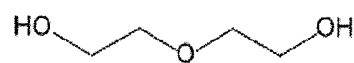
Figure 4:
Figure 4:
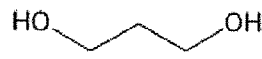
Figure 4:
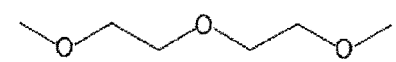
Figure 4:

A liquid electrolyte for evaluation was obtained in the same manner as in Example 1, except that triethylene glycol dimethyl ether (manufactured by Kishida Chemical Co., Ltd.) was used instead of a diol compound and stirring conditions were changed to 30° C. for 72 hours. However, the TMAF was not dissolved. Incidentally, in FIG. 4, chemical formulas of compounds used in Examples 1 and 2 and Comparative Examples 1 to 4 are shown.

[Evaluation]

(Measurement of Cyclic Voltammetry)

CV measurement was performed for the liquid electrolyte for evaluation obtained in each of Examples 1 and 2 and Comparative Examples 1 and 2. Specifically, the evaluation was made by using a dip type three-electrode cell in a glove box under Ar atmosphere. For an acting electrode, a Cu plate was used. For a counter electrode, a composite electrode composed of PTFE, acetylene black (AB), and fluorinated carbon was used. Incidentally, the composite electrode is an electrode with a weight ratio of PTFE:AB:fluorinated carbon=1:2:7. Furthermore, by using vycor glass, a reference electrode was separated from the liquid electrolyte for evaluation. Incidentally, as for the reference electrode, Ag wire immersed in an acetonitrile solution, in which each of silver nitrate and teterabutyl ammonium perchlorate is dissolved at a concentration of 0.1 M, was used. Furthermore, the measurement was performed under conditions of room temperature and a sweep rate of 1 mV/s.

Figure 5:
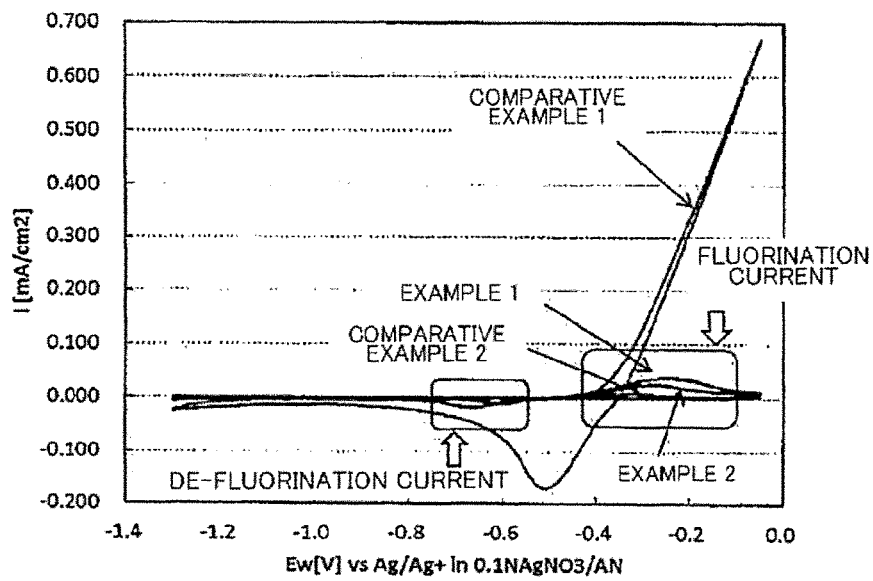
FIG. 5 shows the result of CV measurement of the liquid electrolyte for evaluation obtained in each of Examples 1 and 2 and Comparative Examples 1 and 2.
Figure 6:
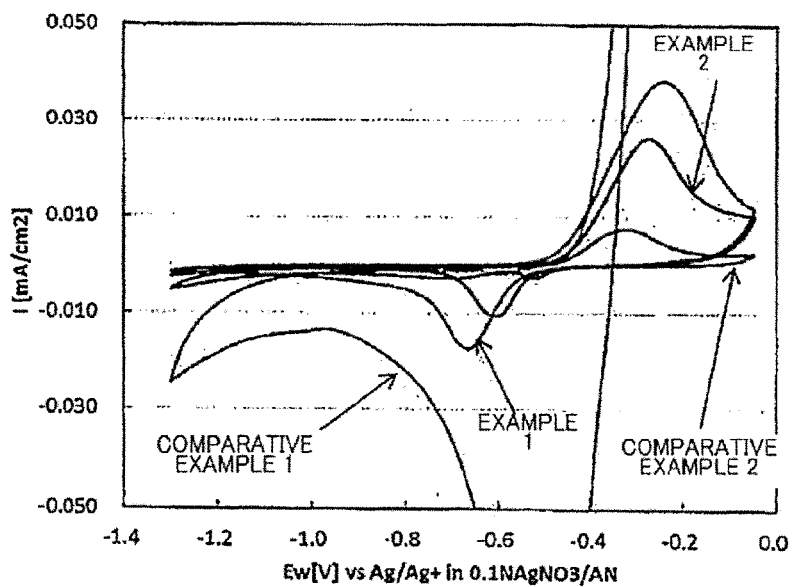
FIG. 6 is an enlarged view of FIG. 5.

FIGS. 5 and 6 show the result of CV measurement of the liquid electrolyte for evaluation obtained in each of Examples 1 and 2 and Comparative Examples 1 and 2. As shown in FIGS. 5 and 6, in Examples 1 to 2, an oxidation current peak accompanied with fluorination of copper was determined around −0.3 V, and also reduction current peak accompanied with de-fluorination of copper fluoride was determined around −0.7 V. Meanwhile, unlike Examples 1 and 2, an oxidation current peak accompanied with fluorination of copper and reduction current peak accompanied with de-fluorination of copper fluoride were not shown in Comparative Examples 1 and 2. Accordingly, fluorination and de-fluorination of the metal were confirmed when the specific diol compounds were used.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A liquid electrolyte for a fluoride ion battery comprising:
   a fluoride salt that generates a fluoride ion that reacts with an active material; and
   a diol compound in which one or two ether bonds are disposed between two OH groups.

2. The liquid electrolyte for a fluoride ion battery according to claim 1, wherein a molar ratio of the diol compound relative to a fluoride ion is more than 0.5.

3. A fluoride ion battery comprising:
a cathode active material layer;
an anode active material layer; and
an electrolyte layer formed between the cathode active material layer and the anode active material layer, the electrolyte layer contains the liquid electrolyte for a fluoride salt and a diol compound in which one or two ether bonds are disposed between two OH groups, the fluoride salt generates a fluoride ion that reacts with an active material of at least one of the cathode active material and the anode active material.

4. The liquid electrolyte for a fluoride ion battery according to claim 3, wherein a molar ratio of the diol compound relative to a fluoride ion is more than 0.5.

* * * * *